United States Patent [19]
Hendry

[11] 3,902,665
[45] Sept. 2, 1975

[54] NOZZLE SHUT-OFF VALVE

[75] Inventor: James Hendry, Holland, Mich.

[73] Assignee: Ex-Cell-O Corporation, Troy, Mich.

[22] Filed: June 10, 1974

[21] Appl. No.: 477,706

[52] U.S. Cl. .................. 239/119; 239/583; 425/467
[51] Int. Cl.² ...................... B05B 15/02; B29F 3/00
[58] Field of Search ........... 239/119, 120, 104, 106, 239/569, 583, 584, 87; 425/466, 467, 381

[56] References Cited
UNITED STATES PATENTS

| | | | |
|---|---|---|---|
| 2,077,938 | 4/1937 | Kuttner............................ | 239/119 X |
| 2,192,884 | 3/1940 | Frank............................ | 239/119 UX |
| 2,686,562 | 8/1954 | MacCracken et al. ............ | 239/119 |
| 2,984,230 | 5/1961 | Cummins..................... | 239/584 UX |
| 3,030,665 | 4/1962 | Eagleton et al................ | 425/467 X |
| 3,068,523 | 12/1962 | Adinoff et al.................. | 239/583 X |
| 3,315,899 | 4/1967 | Quarve.......................... | 239/583 X |
| 3,649,148 | 3/1972 | Waltman et al. ............... | 425/466 X |

Primary Examiner—Robert S. Ward, Jr.
Attorney, Agent, or Firm—James H. Bower

[57] ABSTRACT

An extruder shut-off nozzle with a valve body and orifice having a plurality of metering ports feeding the nozzle passageway. A closure member captive in the body of the torpedo capable of being moved by compressed air after an injection cycle to seal the extruder orifice and prevent drooling of plasticized material at the nozzle when starting the next mold cycle. A suck-back action of the extruder screw at completion of the injection cycle will cause melt normally in the nozzle to be pulled back into the extruder chamber, thereby preventing drooling of plastic from the nozzle when the piston is in the shut-off position.

15 Claims, 8 Drawing Figures

NOZZLE SHUT-OFF VALVE

BACKGROUND OF THE INVENTION

1. Field of the Invention

This invention relates to the method and apparatus for controlling the flow of plastic material through the nozzle of an injection molding machine.

2. Description of Prior Art

Many types of shut-off or control valves in conjunction with nozzles are employed in the plastic injection molding industry. The main purposes of these valves are to prevent plugging of the nozzle or drooling of the nozzle during the period or time cycle of part removal from the mold and the loss of substantial amounts of plastic material in the form of scrap parts. Many methods have been used which try to reduce or prevent this plugging and drooling and yet not involve complicated mechanisms to do this job.

One of the methods is to use a captive spring and a piston which blocks the nozzle passageway until the pressure of the plastic from the extruder during injection applies sufficient force to react against the spring and piston, thus allowing the plastic to flow through the nozzle and into the mold. When the quantity of plastic is sufficient to fill the mold, the injection cycle is complete and the reduced pressure now allows the spring to return the piston to block any flow at the outlet of the extruder. This method has not proved too satisfactory because of spring breakage and fatigue due to the temperatures involved; hence, the loss of proper closing of the nozzle valve giving rise to the condition of the nozzle drooling and hardened plugs of material now being injected into the part mold during the next cycle.

Hydraulic means for operating a nozzle valve of the pin type shut-offs has been used in the art but this too has proven troublesome due to the additional requirement of a hydraulic power supply, a special fluid in the system and special seals to prevent leakage of the fluid into the plastic material. Also, because of the heaters in the nozzle to maintain temperatures to prevent cold spots and plugging of the nozzle, the hydraulic fluid must be able to operate continuously without decomposition. Another major objection is plastic leakage around the nozzle valve pin which increases with usage and wear of the equipment, especially during the injection cycle. This leakage is dangerous because it is a fire hazard, a high maintenance area, and contributes to the contamination of the plastic material.

The invention presented here solves the problems delineated here by utilizing facilities readily available in most plastic molding shops and eliminating those areas which have been troublesome in the present art.

SUMMARY OF THE INVENTION

This invention is used in the plastic molding industry to shut off the flow of plastic material flowing out of the nozzle of an injection molding machine during the plasticizing portion of the mold cycle. The main object of this invention is to prevent the unwanted flow of plastic molding material into an open mold and hence the waste of plastic material and a reliable and positive method of shut-off by an air operated piston contained within the metering nozzle. This shut-off is by the suckback action of the extruder screw and the unidirection flow of factory air to one side of the piston which is sized to seal off the extruder port with a metal to metal seal.

A BRIEF DESCRIPTION OF THE DRAWINGS

DESCRIPTION OF THE INVENTION

Figure 1:
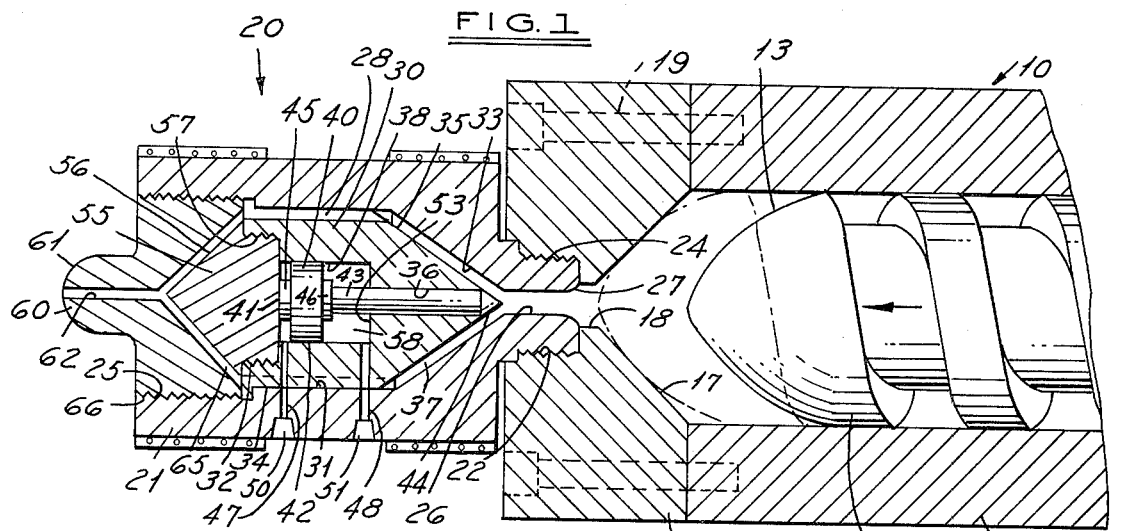
FIG. 1 is a cross section of the nozzle and extruder showing the piston-valve in an open position.
Figure 3:
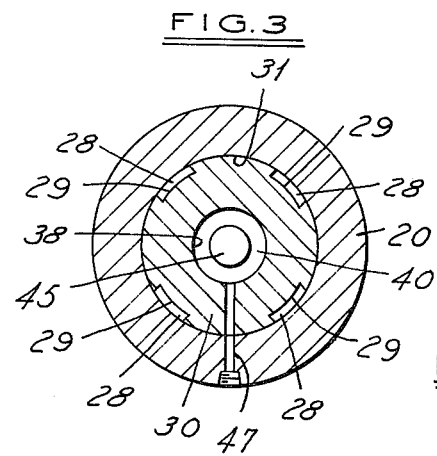
FIG. 3 is a cross section of the metering torpedo taken along line 3—3 of FIG. 2.

Referring now to FIG. 1, the extruder assembly 10 consists of screw 12, cylinder 14 and injection head 15 with the head 15 affixed to cylinder 14 by any conventional means such as socket head screws 19. Conical surface 17 and orifice 18 form the port of the extruder assembly 10 for the free flow of plastic material into the nozzle assembly 20. The nozzle assembly body 21 is affixed to head 15 by threads 22 in head 15 and threads 24 of body 21. Conical surface 27 and bore 26 form the communicating passage from injection head 15 into the nozzle body 21. The conical surface 33 of body 21 and frustum surface 35 of torpedo 30 form a conic passage 37 from the inlet bore 26 to the metering ports 28, best shown in FIG. 3. A plurality of ports 28 are formed by the slots 29 in torpedo 30 and diameter 31 in body 21. The torpedo 30 is a bullet-shaped part consisting of diameter 34 and frustum surface 35. Inside torpedo 30 is bore 36 and bore 38 forming a close fitting passage for piston 40 with diameter 42 and diameter 43 fitted to slide easily in bores 38 and 36, respectively. The rod end diameter 43 is tapered to form cone point 44 to complete the rod end. The diameter 43 is sized to conjoin with bore 26 to form a fitted piston-valve. The piston end diameter 42 is necked down to diameter 45 intersecting with surface 41 to form a stop which prevents an air lock from occurring in bore 38 when in the open position. Diameter 46 on piston 40 forms a shoulder which acts as a stop in the closed position against surface 53 in the torpedo 30. Passages 47 and 48 are made from threaded holes 50 and 51 respectively through body 21 and torpedo 30 into diameter 38.

Figure 4:
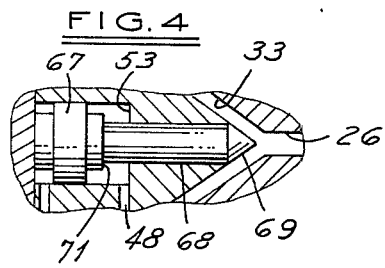
FIG. 4 is a cross section of the nozzle showing the piston-valve and alternate valve seat method by modification to the rod end.
Figure 5:
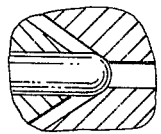
FIG. 5 is a cross section showing the valving with the rod end as a hemisphere.
Figure 7:
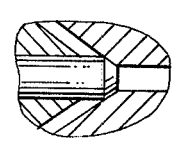
FIG. 7 is a cross section showing the valving with the rod end as a chamfer.
Figure 6:
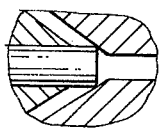
FIG. 6 is a cross section showing the valving with the rod end as a blunt end.
Figure 8:
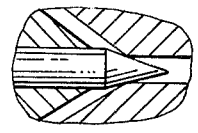
FIG. 8 is a cross section showing the valving with the rod end as a needle point.

An alternate valving method is shown in FIG. 4 wherein the intersection of bore 26 and conical surface 33 form a valve seat against which cone point 69 at the end of rod diameter 68 of piston 67 can seat (as shown in phantom) to prevent the flow of plastic material. The piston 67 is air operated in the same manner as the fitted valve 40 except that there is no need for a shoulder on the rod end of the piston. The length of the rod end 68 will be of sufficient length to prevent surface 71 from touching surface 63 and, hence, sealing of passage 48. In this method, the angle of the cone point is shown to equal the angle of the conical seat and is the optimum for this style design.

Additional valving methods are shown in FIG. 5 through FIG. 8 wherein the intersection of bore 26 and conical surface 33 form a valve seat against which the various schemes of sealing the bore 26 are shown.

Bullet 55 consisting of conical surface 56 and threads 57 is threaded into threads 32 of torpedo 30 forming the full torpedo section. Nozzle 60 has a blunted sphere 61 which will communicate with the mold opening for passage of plastic material through outlet hole 62. Cone-shaped surface 63 forms the one side of a conic passage with surface 56 forming the other side. The nozzle 60 is affixedly held in body 21 by threads 25 and external threads 66 on nozzle 60. With nozzle 60 in place, the torpedo section is held firmly in place.

OPERATION OF THE INVENTION

Plastic molding material will be plasticized in the extruder assembly 10 and, when the proper amount of plastic material to fill a given mold is accumulated, the extruder screw 12 will cease rotating and will move forward in the direction of the arrow to the position shown in phantom in FIG. 1, filling the mold. The material will flow during this injection cycle through orifice 18, bore 26, passage 37, 28 and 65 and out hole 62. The injection action will cease when the screw surface 13 stops against conic surface 17 and the injection cycle is over. The screw 12 will now be pulled back in the opposite direction of the arrow shown in FIG. 1, which will cause a suck-back of the plastic melt in all the nozzle passages by the vacuum it forms in the end of the extruder. Dry compressed factory air under pressure is put into passage 47 causing piston-valve 40 to move and rod end 44 will now enjoin bore 26 sealing it off. Vent passage 48 will let trapped air out and will prevent an unwanted back pressure. The air pressure on the piston-vlve end will be maintained.

Figure 2:
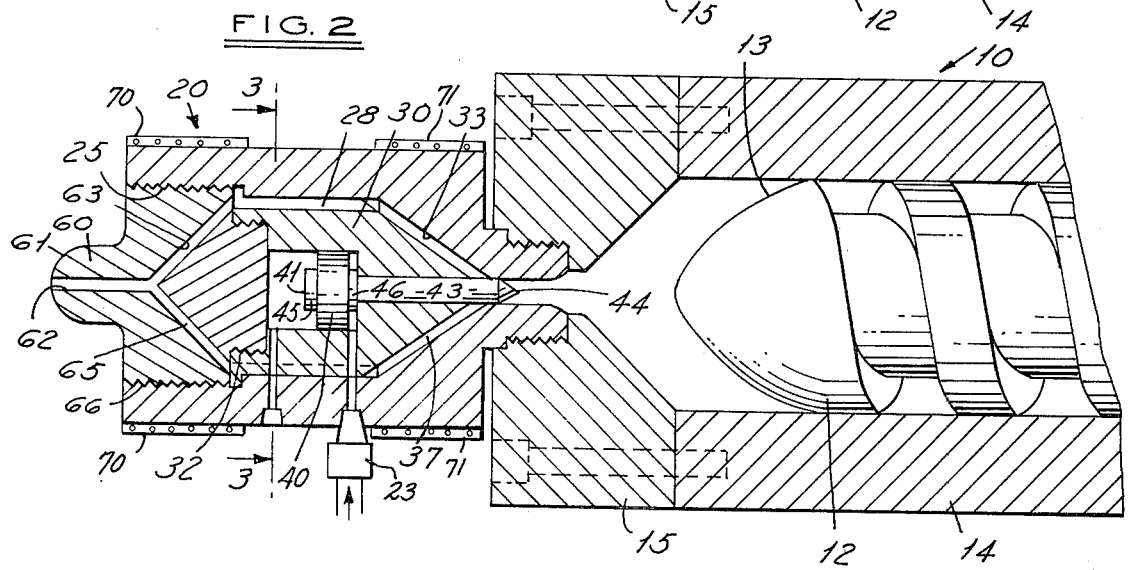
FIG. 2 is a cross section of the nozzle and extruder showing the fitted piston-valve in a closed position.

By this action, unpressurized plastic material will be left in the nozzle and will not leak or drool out when the mold is opened to eject the part or parts. Heater bands 70 and 71 shown in FIG. 2 are located around the body 21 to keep the temperature in this area correct to assure the suck-back action of the extruder screw. Since the mold itself is cooler than the nozzle, a dimpling of the sprue may occur on the suck-back but no plastic material will be taken from the molded part itself.

As the extruder assembly 10 starts to again plasticize material, the void between the front surface 13 of screw 12 and conical surface 17 and orifice 18 of extruder head 15 now fill with plasticized material. The pressure of this melt can build up to 500 p.s.i. but will easily be contained within the extruder assembly 10 by the rod end 43 of piston-valve 40 by the air pressure applied to the piston end of the valve. When the next cycle is to begin, the air pressure is vented to the atmosphere from passage 47 and the piston 40 can now be pushed back against bullet 55 by the plastic material under pressure. A sintered bronze filter 23 may be screwed into thread 51 of the body 21 to prevent contamination of the internal piston chamber 58 in torpedo 30. If necessary, although highly unlikely, air pressure could be put into passage 48 via threaded hole 51 if pressure of the plasticized material did not build up force to unseat or disenjoin the rod end 43 of the piston-valve 40.

It is noted that dry factory air be used which is readily available in most factory environments. An inexpensive dryer can be added to a normal compressed air line in a factory if one is not available. This dry air is required to filter out moisture which could cause corrosion of the piston-valve 40 that may prevent proper operation of the nozzle and valve. The chrome plating, or a similar treatment, of all internal parts will also prevent corrosion of the parts.

Many other embodiments of this invention may be made without departing from the spirit and scope thereof; it being understood that this invention is not limited solely to the embodiments so disclosed.

I claim:

1. An apparatus for controlling the flow of plasticized melt from an extruder assembly comprising:
    a. a body having an inlet bore means;
    b. means for affixing said body to extruder assembly;
    c. a nozzle having an outlet hole means;
    d. means for affixing said nozzle means to body means;
    e. an inlet bore means communicating with extruder to a passage means inside said body and said passage means in body for communicating to nozzle outlet hole means; and
    f. a piston means for sealing the inlet bore means.

2. The apparatus in claim 1 wherein the piston means is operated by compressed air.

3. The apparatus in claim 1 wherein a plurality of heater bands encircles the body means.

4. The apparatus in claim 3 wherein the piston means is operated by compressed air.

5. The apparatus of claim 4 wherein the vent passage incorporates an air filter.

6. The apparatus of claim 1 wherein the sealing means of said passage is by enjoining the rod end of the piston into the inlet bore.

7. The apparatus of claim 1 wherein the sealing means of said passage is by a conical-shaped rod end and valve seat formed by the inlet bore and conical surface.

8. The apparatus of claim 1 wherein the sealing means of said passage is by a spherical rod end and valve seat formed by the inlet bore and spherical surface.

9. The apparatus of claim 1 wherein the sealing means of said passage is by a needle-shaped rod end and valve seat formed by the inlet bore and needle-shaped surface.

10. The apparatus of claim 1 wherein the sealing means of said passage is by a chamfered rod end and valve seat formed by the inlet bore and chamfered surface.

11. The apparatus of claim 1 wherein said passage means comprises a first conic passage connecting to a plurality of ports which connect to a second conic passage.

12. The apparatus of claim 11 wherein a torpedo means is disposed having a plurality of slots and shaped to form the first and second conic passages.

13. The apparatus of claim 12 wherein the piston means for sealing the inlet bore is disposed within the torpedo means.

14. The apparatus of claim 13 wherein the sealing means of said inlet bore is by enjoining the rod end of the piston into the inlet bore.

15. The apparatus of claim 14 wherein a plurality of heater bands encircles the body means.

* * * * *